(12) United States Patent
Watson (10) Patent No.: US 7,002,660 B2
(45) Date of Patent: *Feb. 21, 2006

(54) LIQUID CRYSTAL DISPLAYS

(75) Inventor: David Stewart Watson, Edinburgh (GB)

(73) Assignee: Bae Systems plc, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/250,242

(22) Filed: Jun. 17, 2003

(65) Prior Publication Data

US 2003/0184706 A1 Oct. 2, 2003

Related U.S. Application Data

(63) Continuation of application No. 09/529,201, filed as application No. PCT/GB98/02586 on Aug. 27, 1998.

(30) Foreign Application Priority Data

Oct. 15, 1997 (GB) .................................. 9721804
Jul. 7, 1998 (GB) .................................. 9814577

(51) Int. Cl.
*G02F 1/1333* (2006.01)
(52) U.S. Cl. ...................... 349/187; 349/150; 349/153; 349/158; 349/190
(58) Field of Classification Search ................. 349/73, 349/96, 153, 158, 149, 150, 187, 190; 445/24, 445/25
See application file for complete search history.

(56) References Cited

U.S. PATENT DOCUMENTS

| | | | |
|---|---|---|---|
| 4,094,058 A | 6/1978 | Yasutake et al. | |
| 4,275,494 A | 6/1981 | Kohyama et al. | |
| 5,164,853 A | 11/1992 | Shimazaki | |
| 5,278,685 A | 1/1994 | Iwamoto et al. | |
| 5,492,582 A | 2/1996 | Ide et al. | |
| 5,610,742 A | 3/1997 | Hinata et al. | |
| 5,757,456 A | 5/1998 | Yamazaki et al. | |
| 5,781,258 A | 7/1998 | Dabral et al. | |
| 5,808,719 A | 9/1998 | Fujiwara et al. | |
| 5,812,226 A | 9/1998 | Izumi et al. | |
| 5,851,411 A | 12/1998 | An et al. | |

(Continued)

FOREIGN PATENT DOCUMENTS

GB 2 064 843 6/1981

(Continued)

OTHER PUBLICATIONS

Masahiro Yanagi; *Module Advances Move TN, STN LCDs into Portable Tools;* Display Devices; Spring '97, Serial No. 15; p. 10 and 18.

(Continued)

*Primary Examiner*—Toan Ton
*Assistant Examiner*—Tai Duong (57) ABSTRACT

A custom made liquid crystal display is formed from a pre-manufactured liquid crystal display by removing an excess region. The drive card is cut along the line X—X and the excess TABs are disconnected from the conductive layer. Optionally, a narrow strip is removed from each of the polarizing substrates between the lines to expose their associated glass plates. A groove is then cut into the exposed surface of each of the glass plates. Each glass plate is then fractured along the base of its groove so that the excess region is detached from the operative region. The cut edges of the glass plates are then sealed by applying a bead of ultra-violet curing adhesive. The processes of removing an excess region by cutting the glass plates with a laser or by freezing the liquid crystal between the glass-plates and machining through the glass plates are also described.

22 Claims, 5 Drawing Sheets

U.S. PATENT DOCUMENTS

| | | | |
|---|---|---|---|
| 5,854,664 | A | 12/1998 | Inoue et al. |
| 5,929,961 | A | 7/1999 | Nishi et al. |
| 6,191,840 | B1 | 2/2001 | Bon |
| 6,204,906 | B1 | 3/2001 | Tannas, Jr. |
| 6,246,454 | B1 | 6/2001 | Koyama et al. |
| 6,380,999 | B1 | 4/2002 | Tannas, Jr. |
| 2002/0118335 | A1 | 8/2002 | Tannas, Jr. |

FOREIGN PATENT DOCUMENTS

| | | |
|---|---|---|
| GB | 2 183 073 | 5/1987 |
| GB | 0 556 855 | 8/1993 |
| GB | 2 269 910 | 2/1994 |
| GB | 2 330 423 | 4/1999 |
| JP | 55-84918 | 6/1980 |
| JP | 57-51136 | 3/1982 |
| JP | 57-099615 | 6/1982 |
| JP | 57-109918 | 7/1983 |
| JP | 59008632 | 1/1984 |
| JP | 59-21535 | 2/1984 |
| JP | 59-217631 | 12/1984 |
| JP | 60-146228 | 8/1985 |
| JP | 61-186941 | 8/1986 |
| JP | 61-210326 | 9/1986 |
| JP | 61-251524 | 11/1986 |
| JP | 64-10382 | 2/1989 |
| JP | 01048024 | 2/1989 |
| JP | 1-292313 | 11/1989 |
| JP | 2-235026 | 9/1990 |
| JP | 3-2720 | 1/1991 |
| JP | 3-293633 | 12/1991 |
| JP | 5-45617 | 2/1993 |
| JP | 06003633 | 1/1994 |
| JP | 6-48755 | 2/1994 |
| JP | 6-281943 | 10/1994 |
| JP | 7-325280 | 12/1995 |
| JP | 8-76074 | 3/1996 |
| JP | 8-122769 | 5/1996 |
| JP | 8-146444 | 6/1996 |
| JP | 8-194200 | 7/1996 |
| WO | WO 93/11452 | 6/1993 |
| WO | WO 95/19587 | 7/1995 |

OTHER PUBLICATIONS

Locite Brochure; 1989.
Three Bond Co., Ltd. Brochure; *High Performance Sealant for Display Manufacturing Processes;* 1997.
Three Bond Products for the LCD Production Fact Sheet; Apr. 1997; 1 page.
http://www.threebond.co.jp/en/product/electric/glue/1220. html; Products: Threebond 1220 Series; no date; 1 page.
NITTO DENKO Data Sheets; *Optical Films for Liquid Crystal Display;* 3 pages; no date.
NITTO DENKO Brochure; *LCD Related Materials;* 1993; 4 pages.
Dow Corning Brochure; *A Selection Guide to Silicone Materials for High Technology Applications;* 6 pages; no date.
Loctite Fact Sheet; OUTPUT™ 315; *Electronics Products;* Jun. 1999; 1 page.
J.J. Doyle, et al.; *Unexplained Voids in LCDs;* Society for Information Display International Symposium Digest of Applications Papers vol. XXVI; Orlando, Florida May 23-25, 1995; pp. 24-27.
Van Angelo; *Comparison of custom vs COTS AMLCD's for military and avionic applications;* Cockpit Displays IV; Flat Panel Displays for Defense Applications; SPIE vol. 3057; 1997; pp. 52-53.
Malcolm L. Jukes; *Designing Display for severe environment Military Fighter applications;* Cockpit Displays IV; Flat Panel Displays for Defense Applications; SPIE vol. 3057; 1997; pp. 128,132,134.
Randall E. Orkis; *F-16 retrofit application using a modular avionics system architecture and color active matrix liquid crystal displays;* Cockpit Displays—Proceedings SPIE—The International Society for Optical Engineering; vol. 2219; Orlando, Florida, Apr. 7-8, 1994; pp. 178,185.
Derwent World Patents Index Database Search (61 pages).
Literature Search Report (73 pages).
Vetter et al., "Influence of Fabrication Process on LC Resistivity in TFT Displays"; Eurodisplay '90, The Tenth International Display Research Conference; Sep. 25-27, 1990; p. 320-323.
Morozumi; "Materials and Assembling Process of LCDS"; Liquid Crystals-Applications and Uses; vol. 1; 1990; Chapter 7, pp. 171-194.
J. Doyle, "ARC-164 Liquid Crystal Display Module Void Investigation Meeting Minutes 11, Aug. 12, 1994" (Sep. 7, 1994).
DYMAX Corporation , Frequently Asked Questions, 2001, 4 pages; www.dymax.com/faq.asp.
DYMAX Corporation Brochure, "Eliminate obstacles to throughput and performance", 2001, 6 pages.
DYMAX Corporation Brochure, "Adhesives and Coatings for Automotive Assembly", 2002, 6 pages.
"Outgassing", About.com, 1989.

LIQUID CRYSTAL DISPLAYS

CROSS REFERENCE TO RELATED APPLICATIONS

This application is a Continuation of co-pending application Ser. No. 09/529,201, filed May 18, 2000, which was a 371 U.S. national phase of PCT/GB98/02586, filed Aug. 27, 1998, which designated the U.S.

BACKGROUND OF INVENTION

This invention relates to a liquid crystal display, to a method of manufacturing a liquid crystal display, and also to apparatus to aid manufacture of a liquid crystal display.

Generally, displays for reproduction of information have historically been of a cathode ray tube type construction. In an environment where space is limited traditional displays were typically manufactured to be square, or square with rounded corners, in order to make the best use of the limited space available.

Liquid crystal displays are currently considered suitable substitutes for applications previously requiring cathode ray tube technology. The replacement of cathode ray tubes can be either for new applications or for the purpose of upgrading existing technology through retrofit design. When manufactured in large quantities, liquid crystal displays are of modest cost compared with an equivalent cathode ray tube.

However, when liquid crystal displays need to be custom made in relatively low numbers to suit specific requirements, the cost per unit is very high due to expensive tooling and manufacturing charges. Furthermore, manufacturing yield rates are low, high pixel defect levels have to be tolerated and there are substantial delivery delays.

SUMMARY OF INVENTION

It is an objective of the present invention to facilitate the production of custom made liquid crystal displays.

According to a first aspect of the present invention, a method of manufacturing a liquid crystal display having a liquid crystal sealed between first and second substantially parallely spaced transparent plates which form an operative area of the display, comprises removing an excess region of a pre-manufactured liquid crystal display by cutting the first and second plates to isolate the excess region of the first and second plates and to expose cut edges along the operative areas of the first and second plates. The terms operative area and operative display as used throughout this document mean an area of the parallel plates that is electrically addressable.

The terms "cutting or cut" as used throughout this document means the action of separating an excess region from an operative region in any way. For example, this may be achieved by grooving and then fracturing a plate, or cutting through a plate with a laser or machine tool.

The inventor has determined that, contrary to the present understanding of the nature of liquid crystal displays, the highly complex electronic and physical structure of such displays can be remanufactured to provide alternative shaped displays at a much reduced cost per unit, when compared with the cost of a custom made display, and without substantial damage to the display. Furthermore, standard sized displays are readily available devices which may be found in personal computers and other products which use standard sized liquid crystal displays and are manufactured in very high volumes, and hence at low cost.

A liquid crystal display comprises a liquid crystal sealed between first and second parallely spaced transparent plates which form an operative area of the display. In such a display there is a miniscule spacing between the plates. The inventor has discovered that this spacing, when the plates are re-manufactured, exerts a capillary action on the liquid crystal which retains the liquid crystal between the plates without appreciable loss or disruption of the liquid crystal.

By using a method in accordance with the invention, it is possible to start with an inexpensive standard display and re-fashion it to particular requirements, instead of designing and manufacturing a small number of expensive custom displays or ordering such custom displays from a specialist manufacturer with an added high premium.

The transparent plates are usually formed from glass or another suitable transparent material. The method may include cutting the first and second plates at an oblique angle.

The method may also include removing the excess region of the pre-manufactured liquid crystal display by forming a first groove in the first plate of sufficient depth to isolate the excess region of the first plate, forming a second groove in the second plate of sufficient depth to isolate the excess region of the second plate, the second groove being substantially aligned with the first groove, and fracturing the first plate and second plate along their respective grooves.

The method may include forming the first and second grooves simultaneously and may also include fracturing the first and second plates simultaneously along the first and second grooves.

The method may include fracturing the first plate along the first groove prior to forming the second groove in the second plate and fracturing the second plate along the second groove.

The method, may further include fracturing each grooved plate by placing the other plate on a ridge substantially corresponding with the groove and applying pressure to the excess region.

Preferably, the liquid crystal display is placed on an apparatus comprising a fracturing platform having a first light polarizing layer to polarize radiation emitted from a radiation source and a second light polarizing layer located between a viewer's eye position and the liquid crystal display, and the method may include viewing the propagation of each fracture along its groove as an area against a contrasting background through the second light polarizing layer.

Alternatively, the method may include removing the excess region of the pre-manufactured liquid crystal display by cutting the first and second plates using a laser beam thereby isolating the excess region of the first and second plates and exposing the cut edges along the operative areas of the first and second plates. The laser beam may cut entirely through both plates, and this may done from one side of the display. Use of a laser to cut the plates gives good control of the cutting process and is particularly suitable where more complex or rounded configurations are required. It is also envisaged that a laser beam can be used to form grooves in each plate and then pressure applied to the excess area to fracture each plate along the groove. In this manner contamination of the liquid crystal is avoided since the plates may be cleaned after grooves has been formed.

In a further alternative, the method may include removing the excess region of the pre-manufactured liquid crystal display by freezing the liquid crystal between the first and second plates and machining through the first and second plates thereby isolating the excess region of the first and second plates and exposing the cut edges along the operative areas of the first and second plates. It will be understood that the term freezing includes any reduction in the viscosity of the liquid crystal thereby inhibiting its egress from between the first and second plates.

Although freezing is particularly applicable to this further alternative, it may also be used in other methods in accordance with the invention, for example, when a laser beam is used or the plates are fractured following grooving. Accordingly, the method may include freezing the liquid crystal between the first and second plates prior to cutting the first and second plates.

In the case where conductive layers are adhered to the first and second plates and are electrically connected to driver connections, the method may also include cutting and removing any driver connection associated with the excess region prior to cutting the first and second plates. In the case where a light polarizer is adhered to at least one of the plates, the method may include cutting and removing a narrow strip of the light polarizer in a region either side of where the cut edge associated with each plate is to be formed.

The method may also include removing air voids within the liquid crystal by applying pressure to at least one of the plates.

Preferably, the method may include sealing the exposed fractured edges to retain the liquid crystal between the first and second plates. The method may include sealing the exposed cut edges using a laser beam arranged to melt the first and second plates together along the exposed cut edges. This is particularly convenient where a laser beam is used to remove the excess region.

Alternatively, the method may include removing an excess region from at least two pre-manufactured liquid crystal displays to leave exposed cut edges, aligning and positioning the exposed cut edges of one of the liquid crystal displays with the corresponding exposed cut edges of an adjacent liquid crystal display, and laminating the liquid crystal displays to form a single display with increased operative area.

According to a second aspect of the invention, a liquid crystal display comprises a pre-manufactured liquid crystal display having a liquid crystal sealed between first and second parallely spaced transparent plates and in which an excess region of the pre-manufactured liquid crystal display has been removed by cutting both of its transparent plates along a common line. In this manner a modified liquid crystal display is provided as a selected portion of a pre-manufactured liquid crystal display.

The first and second plates may be cut at an oblique angle. The cut edges of the transparent plates may be resealed to retain the liquid crystal. A laser beam may be used to melt the first and second plates together.

A composite liquid crystal display preferably comprises at least two of these modified liquid crystal displays supported with their respective cut edges aligned and abutting. The cut edges are preferably supported in alignment by a transparent lamina adhered over their first transparent plates. The cut edges may additionally be supported in alignment by a second lamina adhered over their second transparent plates.

According to a third aspect of the present invention apparatus, to aid removal of an excess region of a pre-manufactured liquid crystal display having liquid crystal sealed between first and second parallel spaced transparent plates which form an operative area of the display and in which a groove has been formed in one of the plates between the excess region and an operative region of the liquid crystal display, comprises a fracturing platform having a light polarizing layer located between transparent first and second supporting surfaces, a radiation source located to emit radiation through the fracturing platform, a raised region arranged on an opposite surface of the fracturing platform to which the light source is located, the raised region being arranged to contact a plate of the liquid crystal display in a region substantially corresponding to the groove in the other plate, and a light polarizing layer disposed between a viewer's eye position and a liquid crystal display located on the fracturing platform. In this manner a viewer observes the liquid crystal display as a dark area and when the viewer applies pressure to the excess region any fracture in the grooved plate appears as a light area.

The operative area of the liquid crystal display may be clamped to the fracturing platform whilst leaving the excess region freedom of movement. The raised region may be a ridge.

BRIEF DESCRIPTION OF DRAWINGS

The invention will now be described, by way of example only, with reference to the accompanying drawings, in which.

DETAILED DESCRIPTION

Figure 1:
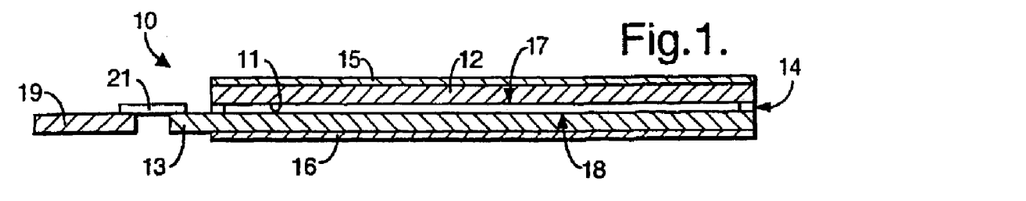
FIG. 1 is a diagrammatic cross-section through a conventional prior art liquid crystal display taken along the line 1—1 in FIG. 2.

In FIG. 1, a typical liquid crystal display 10 comprises liquid crystal 11 trapped between first and second parallely spaced transparent glass plates 12, 13 by an ultra-violet cured adhesive seal 14. Patterned light polarizing substrates 15, 16 are respectively adhered to the outer surfaces of the glass plates 12, 13. Very thin conductive layers 17, 18 are respectively coated over the inner surfaces of the glass plates 12, 13 and are used to generate an electric field between corresponding portions of the conductive layers 17, 18 to cause the liquid crystal 11 in the field to rotate and block light from passing. No light can pass the rotated electric crystal within the electric field and a viewer will observe a dark area corresponding to the shape of the electric field. By controlling a plurality of such corresponding portions of the conductive layers 17 and 18, the liquid crystal display 10 can be operated to convey information to the viewer.

Figure 2:
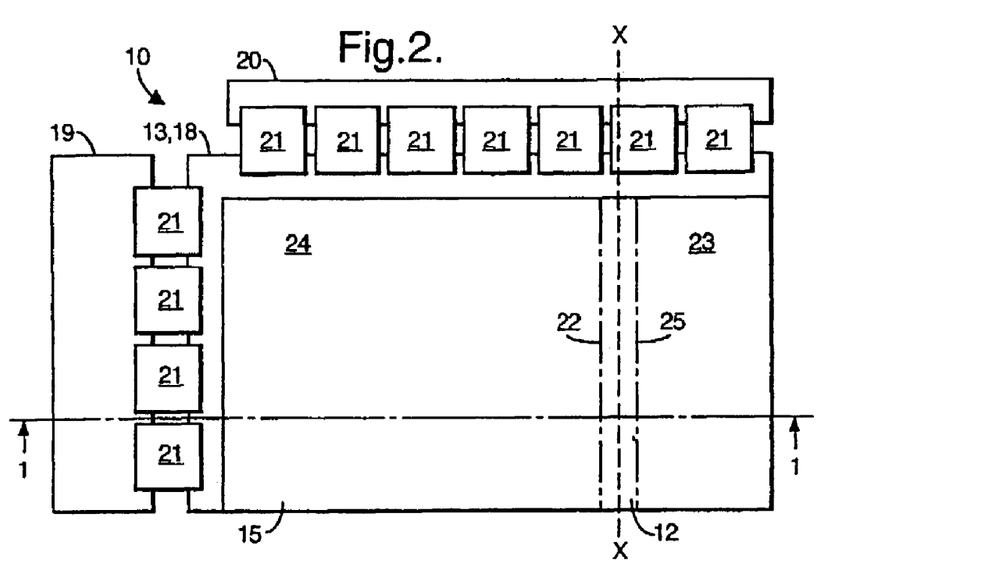
FIG. 2 is a plan view of the pre-manufactured liquid crystal display illustrated in FIG. 1, but showing the removal of an excess region along its right-hand edge.

In a first embodiment, as will be seen from FIGS. 1 and 2, the glass plate 13 and its associated conductive layer 18 are larger than the glass plate 12 so that they extend to the left towards a vertical driver card 19, and upwards towards a horizontal driver card 20. A series of ribbon connectors or TABs 21 electrically interconnect the driver cards 19 and 20 with the various portions of the conductive layers 17 and 18 in well-known manner so that the driver cards 19, 20 will determine which portions of the conductive layers 17 and 18 are to be energized.

Figure 3:
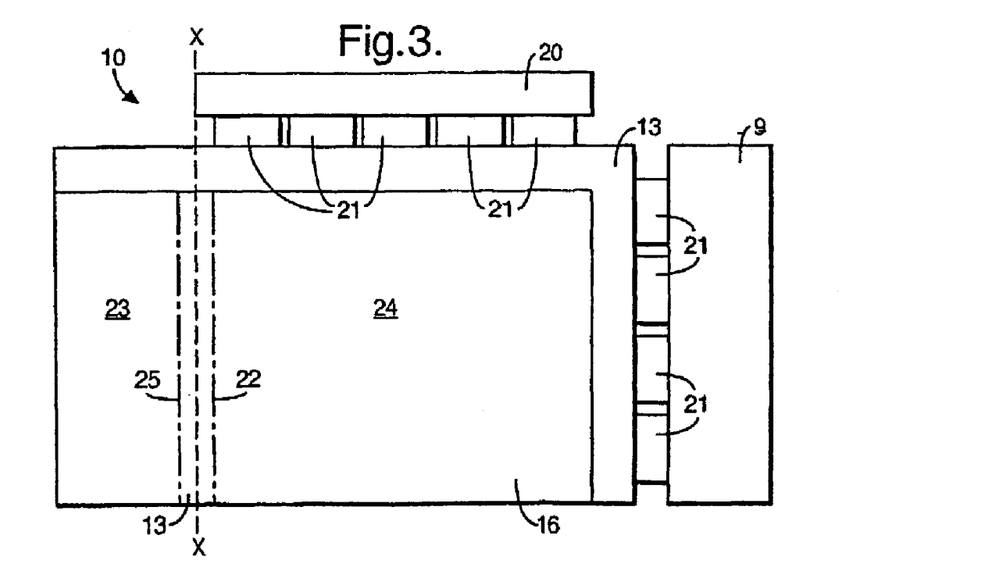
FIG. 3 is an underplan view of the liquid crystal display illustrated in FIG. 2.

FIG. 3 shows the reverse side of the liquid crystal display 10, the reverse side of the vertical and horizontal TAB's 21, driver cards 19 and 20, and the light polarizing substrate 16.

In FIGS. 2 and 3 the required width of the final liquid crystal display is indicated by a chained line 22 and is achieved by removing an excess region 23 of the liquid crystal display 10 in the following With reference to FIG. 2, one of the vertical driver cards 20 is cut, using any suitable cutting apparatus, along a broken line X—X which is located just outside an operative region 24 of the liquid crystal display 10 that is to be retained. The vertical driver card 20 may be held in a support fixture, not shown, and a fine tooth saw may be used to cut through the vertical driver card 20 along the line X—X. This cut must be beyond any TAB 21 carrying connections to the operative region 24 that are to be retained. Any rough edges can be filed to prevent any track cut from shorting.

The portion of the vertical driver card 20 for the excess region 23 is then removed by disconnecting the corresponding TABs 21 using a suitable solvent or heating process. In this manner the removed portion of the vertical driver card 20 and associated TABs 21 are not damaged and can be retained for potential repair use.

Optionally, a narrow strip of the light polarizing substrate 15, defined by the chained line 22 and a parallely-spaced chained line 25 on the opposite side of the line X—X, is then removed using suitable cutting apparatus which will not damage the exposed portion of the underlying glass plate 12. For example, a scalpel can be used to cut along the lines 22, 25 so that the narrow strip of the light polarizing substrate 15 can be peeled off to expose the glass plate 12 which is then cleaned to remove all traces of the adhesive that was used to bond the strip of the light polarizing substrate 15 to the glass plate 12.

A groove is then formed in the glass plate 12 along the line X—X of sufficient depth to promote the generation of a fracture along the length of the groove when pressure is applied to the excess region 23. This groove can be formed using a scribe, a machine tool set to machine a controlled depth, or a diamond wheel cutter. It may also be possible to use a laser beam operated to form a groove of controlled depth. An apparatus used to aid removal of the excess region 23 is described below with reference to FIG. 7.

The liquid crystal display 10 is then reversed to expose its opposite surface as shown in FIG. 3. Again, optionally a narrow strip of the polarizing substrate 16 is removed from either side of the line X—X to expose a region of the glass plate 13. The process of removing the narrow strip of the substrate 16 is the same as that already described for the removal of the narrow strip of the substrate 15. The exposed portion of the glass plate 13 is then cleaned to remove all traces of the adhesive that was used to bond the strip of the light polarizing substrate 16 to the glass plate 13. A groove is then formed in the glass plate 13 along the line X—X of sufficient depth to promote the generation of a fracture along the length of the groove when pressure is applied to the excess region 23. This can again be achieved by using the apparatus that is described below with reference to FIG. 7.

It will be understood that either a groove can be formed in glass plate 12 and the glass plate then fractured along that groove prior to forming a corresponding groove in the other glass plate 13 or corresponding grooves can be formed in both glass plates 12, 13 prior to forming fractures in each plate 12, 13.

By fracturing the glass plates 12 and 13 along the line X—X, the excess region 23 of the liquid crystal display 10 can be removed to expose cut edges of the glass plates 12 and 13. The minuscule spacing between the glass plates 12 and 13 generates a capillary action which acts on the liquid crystal 11 and serves to retain the liquid crystal 11 between the glass plates 12 and 13 so that no appreciable loss or disruption of the liquid crystal 11 occurs.

The process of removing the excess region 22 can create minute voids in the liquid crystal 11, particularly if the cut edges of the transparent plates 12 and 13 do not coincide. Provided the fractures form a clean break, these voids rapidly disappear. Gentle pressure applied to the glass plates 12, 13 can also be used to eliminate some voids and maneuver persistent voids to the cut edges and hence out of the liquid crystal 11. Positioning the line X—X along which fractures are formed further away from the operative region 24 reduces the risk of voids or bubbles being formed.

Although the glass plates 12 and 13 could be cut right through along the line X—X, as described below with reference to FIGS. 6 to 8, there is an increased chance of contaminating the liquid crystal 11 in the operative region with particles of glass and cutting fluid. By only partly cutting through the glass plates 12 and 13, such contaminants can be positively excluded from contact with the liquid crystal, and the glass plates 12 and 13 can be cleaned before being fractured along the line X—X.

If desired, the grooves in the glass plates 12 and 13 can be formed simultaneously by feeding the liquid crystal display between a pair of diamond wheel cutters, thereby also ensuring that the two grooves are parallely aligned. It will be understood that the grooves formed in glass plates 12, 13 and the cutting of the polarizing substrates 15, 16 can be performed in a single action.

Irrespective of whether the grooves in the glass plates 12 and 13 are formed separately or at the same time, in this particular embodiment, the cut edges of the glass plates 12 and 13 are sealed by applying a bead of ultra-violet curing liquid crystal display sealant adhesive, and then curing with an ultra-violet light source. This process provides a liquid crystal display 10 having a reduced operative region 24 without the need to commission the production of a custom display by a manufacturer.

Figure 4:
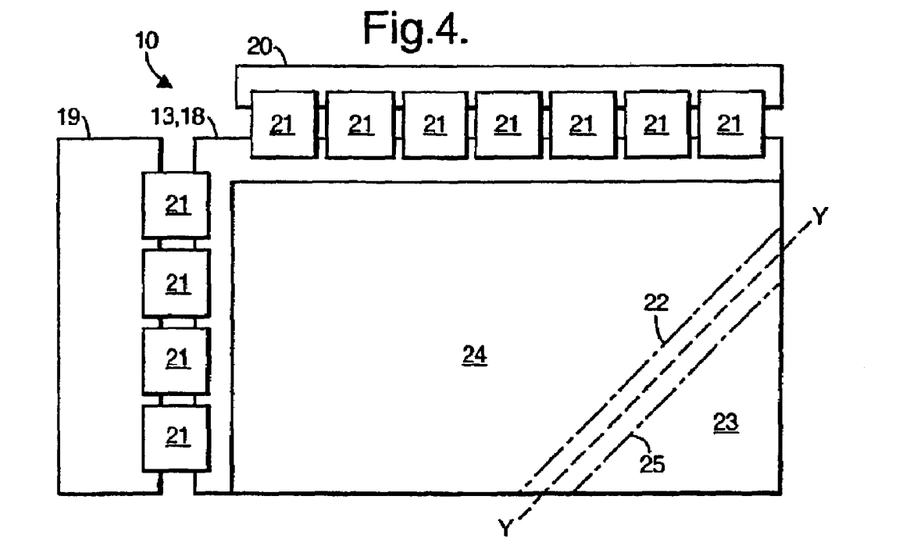
FIG. 4 is a plan view similar to FIG. 2, but showing the removal of an excess region along its right-hand lower corner.

FIG. 4 illustrates a modification of the process described with reference to FIG. 2 to permit the liquid crystal display 10 to be chamfered, that is to have a corner removed. The same reference numerals have been used as in FIGS. 2 and 4 to denote equivalent features and only the points of difference are now described. The excess region 23 is removed from the operative region 24 along a broken line Y—Y which is inclined to both of the card drivers 19 and 20. The removal process is exactly the same as described with reference to FIG. 2 except that there is no need to cut the vertical card driver 20 or to remove any TAB 21.

Figure 5:
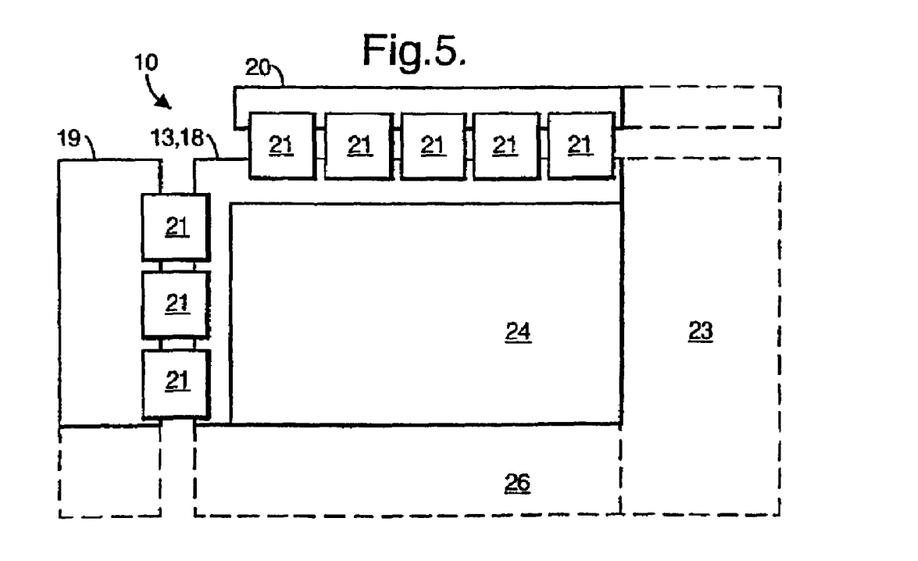
FIG. 5 is a plan view of a pre-manufactured liquid crystal display that has been processed by removing a first excess region along its right-hand edge and a second excess region along its bottom edge to provide a decreased display area.

FIG. 5 show how the liquid crystal display 10, produced as described with reference to FIGS. 1 to 3, can have its operative region 24 reduced still further by removing a horizontal excess region 26 together with the lower portion if the horizontal card driver 19 and associated TAB 21.

Figure 6:
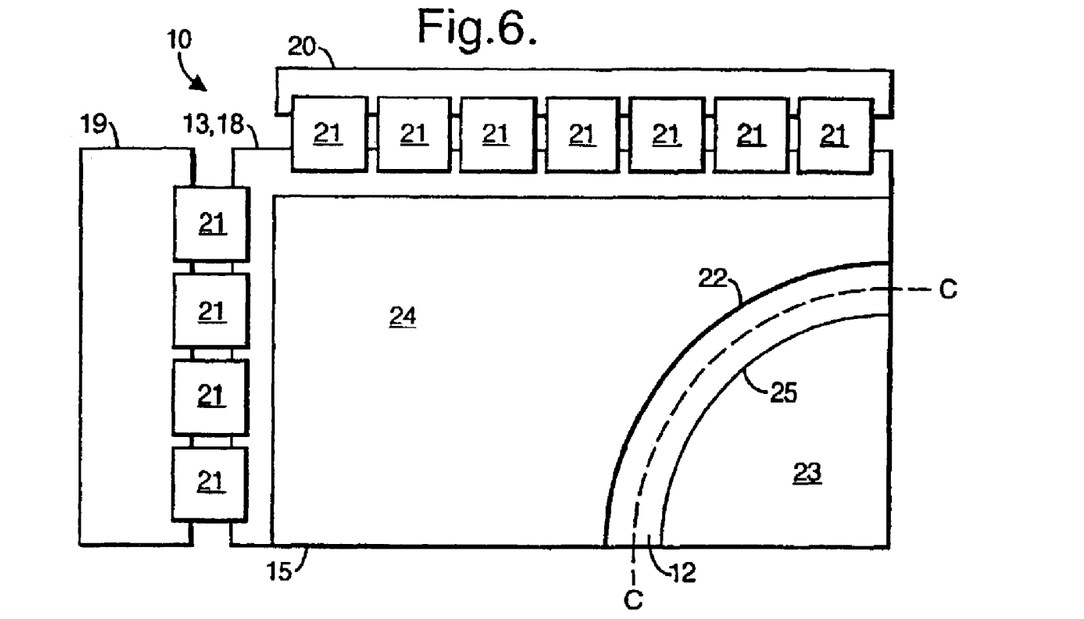
FIGS. 6 and 7 are plan views of pre-manufactured liquid crystal displays which have been processed to remove curved excess regions.
Figure 7:
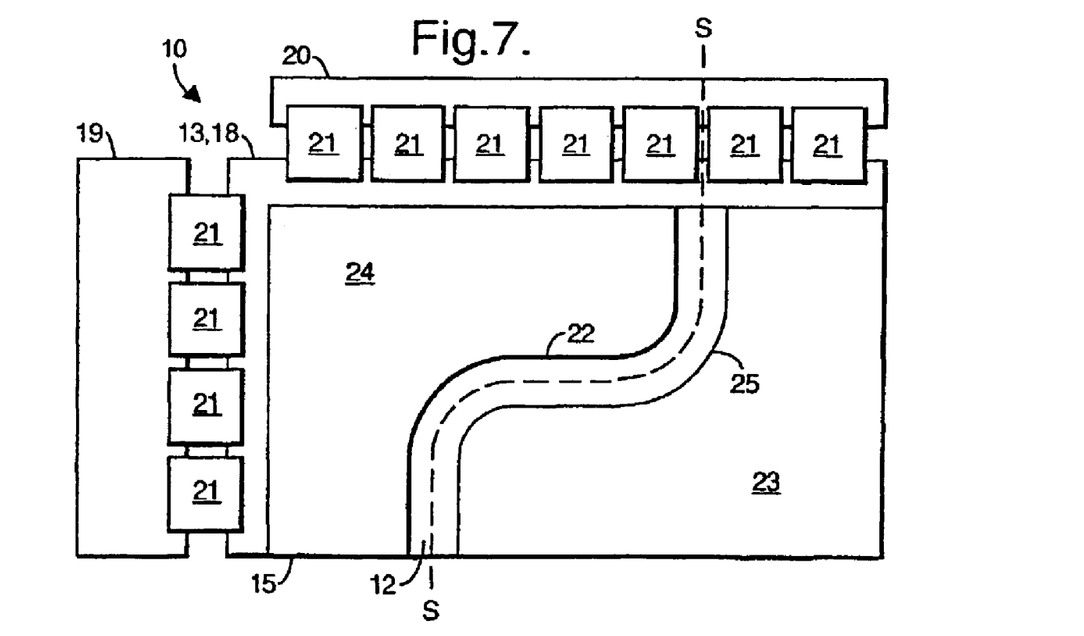

FIGS. 6 and 7 illustrate a second embodiment of the process for removing an excess region from a pre-manufactured liquid crystal display. The same reference numerals have been used as those in FIGS. 2 to 5 to denote equivalent features.

The required shape of the final liquid crystal display 10 is indicated by a solid line 22 and is achieved by removing an excess region 23 of the liquid crystal display 10 in the following manner.

With reference to FIG. 6, narrow strips of light polarizing substrate 15, 16, defined by the solid line 22 and a parallely-spaced line 25 on the opposite side of broken line C—C, are optionally removed from both sides of the liquid crystal display 10 and the exposed areas cleaned, as previously described. A laser, not shown, is then used to cut through glass plate 12 and glass plate 13 along line C—C. In this manner both glass plates 12, 13 are cut at the same time and the excess region 23 of the liquid crystal display 10 can be removed to expose cut edges of the glass plates 12 and 13.

With reference to FIG. 7, a portion of the vertical driver card 20 for excess region 23 is cut and removed by disconnecting the corresponding TAB's 21, as previously described. Narrow strips of light polarizing substrate 15, 16, define by the solid line 22 and a parallely-spaced line 25 on the opposite side of broken line S—S, are optionally removed from both sides of the liquid crystal display 10 and the exposed areas cleaned, as previously described. A laser, not shown, is then used to cut through glass plate 12 and glass plate 13 along line S—S simultaneously, as previously described, to expose cut edges of the glass plates 12 and 13.

It will be understood that although FIGS. 6 and 7 illustrate curved lines C—C and S—S the process of cutting with a laser can equally be applied to the straight line cuts shown in FIGS. 2 to 5 or other cut shapes not illustrated. Furthermore, the laser may be used to cut through the driver card and polarizing substrate.

The gap between the plates 12 and 13 is then sealed either by applying a bead of ultra-violet curing sealant adhesive and curing under ultra-violet light conditions, or applying a glass frit or using the laser to weld the plates 12 and 13 together.

Figure 8:
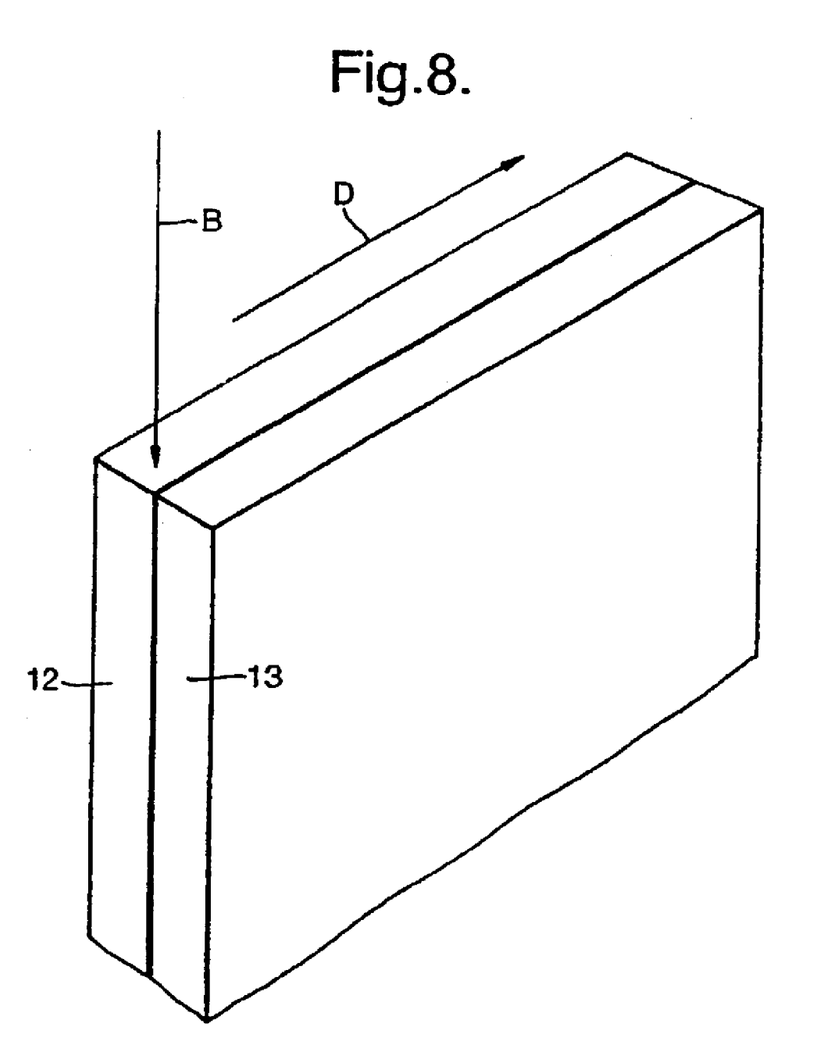
FIG. 8 schematically illustrates sealing of cut edges formed in a pre-manufactured liquid crystal display.

In FIG. 8, the glass plates 12 and 13 can be welded to one another by applying a laser beam B in direction D along the cut edge thereby melting the glass plates 12, 13 and forming a seal between the plates 12 and 13. To aid clarity of FIG. 8, the light polarizing substrates and the conductive layers are not shown and the card drivers and associated TAB's have also been omitted.

In a third embodiment of the process, not illustrated, the liquid crystal within the liquid crystal display or a part thereof can be frozen or have its viscosity reduced using liquid nitrogen and both plates can then be machined through in one action using, for example, a diamond wheel cutter. In this manner the risk of contamination of the liquid crystal is mitigated and the number of voids introduced into the liquid crystal is reduced.

Figure 9:
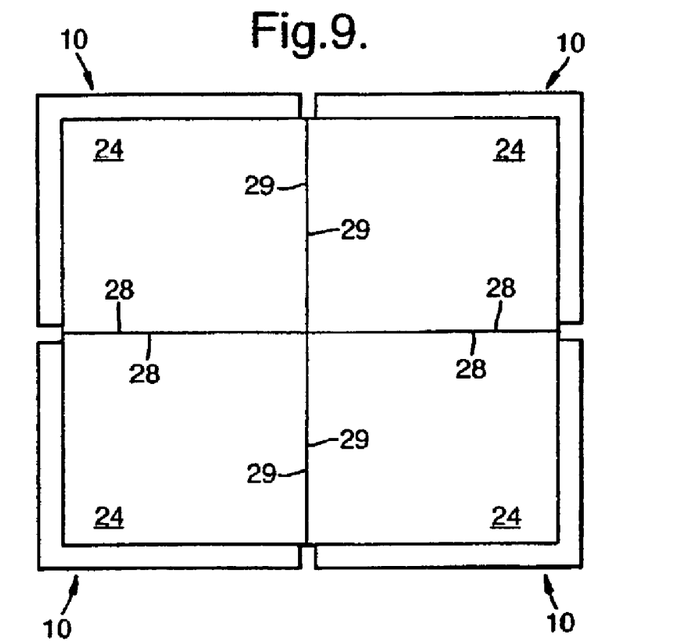
FIG. 9 illustrates the processing of four pre-manufactured liquid crystal displays, each similar to that shown in FIG. 5, to provide an increased display area.

Should a liquid crystal display be required with a larger operative region then, as shown in FIG. 9, four liquid crystal displays 10 can be prepared as described with reference to FIG. 5 and can have their respective operative regions 24 combined by aligning and abutting their respective cut edges 27 and 28, the four liquid crystal displays 10 then being laminated to form a single display with increased operative area. Such lamination is preferably achieved by adhering transparent plates to the entire front and back surfaces of the four operative regions 24 using an optically clear ultra-violet cured adhesive.

The processes described above allow rectangular or square format liquid crystal displays, with reduced or increased operative areas, to be produced quickly and cheaply by reshaping standard commercial rectangular shaped displays which are currently produced in vast quantity at low unit cost and with high quality. Furthermore, since the shaping process is only limited by the positioning of the cards drivers 19, 20 and the excess regions 23, 26 to be deactivated, the process could also be used to produce liquid crystal displays of other shapes, including chamfered corners as taught by FIG. 4, curved shapes taught by FIGS. 6 and 7 and also L-shaped and triangular-shaped formats.

The above process is effective for removing an excess region of a pre-manufactured liquid crystal display in which the cards drivers are relatively simple in format with only a few passive devices associated with each TAB. Where more complex circuitry exists and the card drivers cannot simply be cut, the process described above can be limited to the technique for cutting the transparent plates, the driver cards then being re-engineered or re-positioned using flexible circuit extensions.

The groove or final cut edge of each plate in a liquid crystal display may be arranged such that it forms an oblique angle. In this manner a greater surface area is presented for sealing or bonding to a second liquid crystal display arranged to abut the first liquid crystal display when forming a display having a greater operative area.

Figure 10:
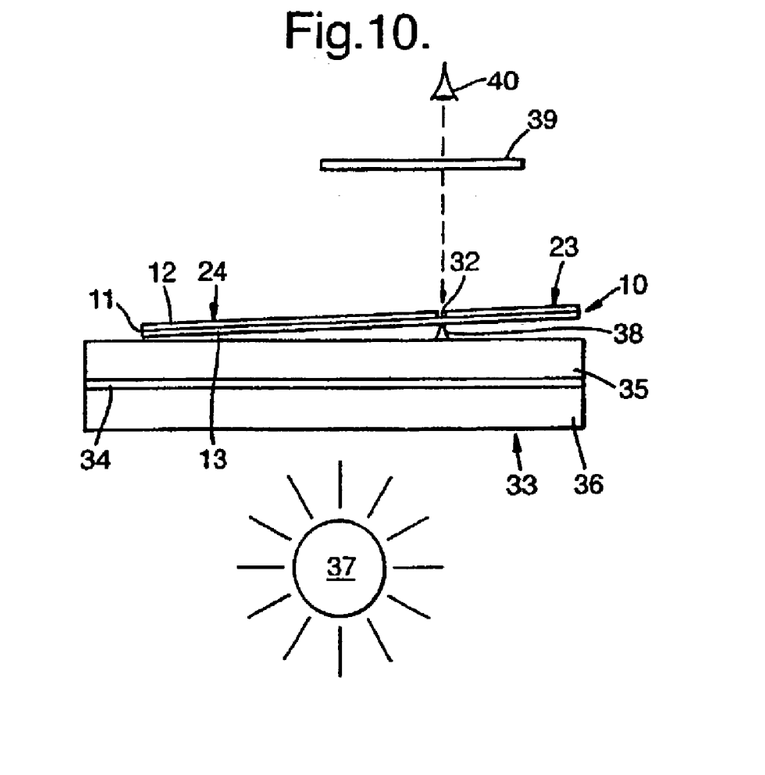
FIG. 10 is a diagrammatic side elevation of apparatus for aiding removal of an excess area of a pre-manufactured liquid crystal display.

FIG. 10 illustrates apparatus 31 to aid removal of an excess area 23 from a pre-manufactured liquid crystal display 10. As described above, the liquid crystal display 10 comprises liquid crystal 11 sealed between first and second parallely spaced glass plates 12, 13 which also define an operative region 24 that is to be retained. To aid clarity of FIG. 10, the light polarizing substrates and the conductive layers are not shown, and the card drivers are also omitted. However, these would typically be arranged as described above with reference to FIG. 1.

A groove 32 has been formed part-way through the glass plate 12 as described above. The apparatus 31 comprises a fracturing platform 33 having a light polarizing layer 34 located between transparent first and second supporting surfaces 35, 36. A radiation source 37, for instance a light source, is arranged to emit radiation through the fracturing platform 33. A raised region, in the form of a ridge 38, is carried by the first supporting surface 25 and is arranged to contact the lower glass plate 13 of the liquid crystal display 10 along a line coinciding with the groove 32 formed in the transparent plate 12.

The apparatus also comprises a light polarizing layer 39 disposed between an operator's eye position 40 and the liquid crystal display 10 which is positively located on the fracturing platform 33.

In operation, the operator observes the liquid crystal display 10 as a dark area since radiation from source 37 is polarized by the layer 34, polarized by the liquid crystal 11 and further polarized by the layer 39. As the operator applies pressure to the excess region 23, the glass plate 12 will start to fracture along groove 32. As the fracture spreads along the groove 32, it will appear as a light area against the dark area background of the liquid crystal display 10 since the thickness of the liquid crystal 11 is different in the regions where fracture has occurred than in those where it has not, varying the degrees of lighting. Radiation will therefore not be polarized by the liquid crystal 11 along the fracture.

Once a fracture in the glass plate 12 has been achieved, a groove corresponding to groove 32 is formed in the glass plate 13 as has been described above. The liquid crystal display 10 is then turned over and repositioned on the fracturing platform 33 with the glass plate 12 contacting the raised edge 38 along either the line of the groove 32 or the line of the corresponding groove in glass plate 13. Again pressure is applied by the operator to the excess region 23 so as to fracture the glass plate 13 along its corresponding groove. When both glass plates 12 and 13 have been fractured along their respective grooves 32, the excess region 23 is removed and the gap between the fractures sealed as described above.

Alternatively, the liquid crystal display 10 can have grooves 32 on both plates 12, 13 prior to fracturing as described above. As a further alternative, once a plate 12 or plates 12, 13 have had grooves 32 applied, the liquid crystal display is placed on the raised edge 38 such that the excess region 23 contacts the raised edge 38 and a downward pressure is applied to groove or grooves 32 to fracture the plate 12 or plates 12, 13.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for changing the physical shape of an electronic display, wherein the display comprises a front plate, a back plate, electrical circuits for operating the display, and image-generating medium sealed in an area between the plates, the method comprising the steps of:
    cutting the display along desired dimensions resulting in a target display portion and an excess display portion, thereby cutting at least some of the electronic circuits;
    removing the excess display portion, thereby exposing an edge of the target display portion; and
    retaining basic functionality of the target display portion.

2. The method of claim 1, wherein the retaining step comprises reestablishing electrical continuity for the electronic circuits that are cut.

3. The method as in claim 2, wherein the reestablishing electrical continuity step comprises attaching new TABS to the display.

4. The method of claim 1, wherein the retaining step comprises sealing the exposed edge of the target display portion.

5. The method of claim 1, wherein the retaining step comprises preventing the image-generating medium for escaping from the between the plates of the target display portion.

6. The method of claim 1, wherein the display comprises a perimeter seal spacing apart the plates, and wherein the cutting step comprises breaking the perimeter seal.

7. A method for changing the physical shape of an electronic display, wherein the display comprises a front plate, a back plate, a perimeter seal spacing apart the plates, and electrical circuits for operating the display, and wherein image-generating medium is sealed in an area between the plates and within the borders of the perimeter seal, the method comprising the steps of:
    cutting the display along desired dimensions resulting in a target display portion and an excess display portion, thereby breaking the perimeter seal of the display and cutting at least some of the electronic circuits;
    removing the excess display portion, thereby exposing an edge of the target display portion; and
    sealing the exposed edge of the target display portion.

8. The method of claim 7, wherein the sealing step comprises applying a first seal to create a barrier to prevent the image-generating medium from escaping out of the area between the plates.

9. The method of claim 7, further comprising:
    scoring a polarizer attached to an upper surface of the front plate resulting in a target polarizer portion and an excess polarizer portion; and
    removing the excess polarizer portion from the display before performing the cutting step.

10. The method of claim 7, further comprising modifying the electronic circuits on the target display portion to retain the basic functionality of the display.

11. The method of claim 7, wherein the cutting step comprises:
    scribing the display along the desired dimensions; and
    breaking the display along the desired dimensions.

12. The method of claim 7, wherein the cutting step comprises mounting the display in a fixture to stabilize the display.

13. The method of claim 7, further comprising reestablishing electrical continuity for the electronic circuits that are cut.

14. The method of claim 13, wherein the reestablishing electrical continuity step comprises attaching new TABS to the display.

15. A method for changing the physical shape of an electronic display, wherein the display comprises a front plate, a back plate, a perimeter seal spacing apart the plates, and electrical circuits for operating the display, and wherein image-generating medium is sealed in an area between the plates and within the borders of the perimeter seal, the method comprising the steps of:
    cutting the display along desired dimensions resulting in a target display portion and an excess display portion, thereby breaking the perimeter seal of the display and cutting at least some of the electronic circuits;
    removing the excess display portion, thereby exposing an edge of the target display portion; and
    retaining basic functionality of the target display portion.

16. The method of claim 15, wherein the retaining step comprises reestablishing electrical continuity for the electrical circuits that are cut.

17. The method of claim 16, wherein the reestablishing electrical continuity step comprises attaching new TABS to the display.

18. The method of claim 15, wherein the retaining step comprises sealing the exposed edge of the target display portion.

19. The method of claim 15, wherein the retaining step comprises preventing the image-generating medium from escaping from the between the plates of the target display portion.

20. A method of manufacturing a liquid crystal display having a liquid crystal sealed between first and second substantially parallely spaced transparent plates which form an operative area of the display, comprising removing an excess region of a pre-manufactured liquid crystal display by cutting the first and second plates to isolate the excess region of the first and second plates and to expose cut edges along the operative areas of the first and second plates.

21. A method of manufacturing an operative liquid crystal display, comprising:

selecting a pre-manufactured, operative liquid crystal display having a display area having a first physical shape and comprising a front plate, a back plate, a perimeter seal spacing apart the plates and sealing an image-generating medium in an area between the plates substantially corresponding to said display area;

identifying a target display portion of said display area of said pre-manufactured liquid crystal display comprising a target portion of said front plate, a target portion of said back plate, and a target portion of said image-generating medium, said target display portion having a second physical shape different from said first physical shape and including at least first and second side edges common to at least a portion of each of first and second side edges of said pre-manufactured liquid crystal display;

cutting the pre-manufactured liquid crystal display to separate said target display portion having said second physical shape from an excess display portion comprising a remainder of said display area of said pre-manufactured liquid crystal display; and removing said excess display portion to expose a third edge of said target display portion whereby said target display portion defines an operative liquid crystal display.

22. A method of re-sizing a pre-manufactured liquid crystal display with an operable visible display portion, comprising the steps of:

selecting a pre-manufactured liquid crystal display having a first physical shape of said operable visible display portion;

identifying a desired second physical shape of operable visible display, said second physical shape comprising a portion of said first physical shape; and removing a portion of the pre-manufactured liquid crystal display first physical shape which exceeds said second physical shape, whereby said second physical shape comprises an operable liquid crystal display.

* * * * *